US012652738B2

(12) United States Patent
Horsky et al.

(10) Patent No.: US 12,652,738 B2
(45) Date of Patent: Jun. 9, 2026

(54) CONVERTER CIRCUIT AND CONTROL METHOD THEREOF

(71) Applicant: SEMICONDUCTOR COMPONENTS INDUSTRIES, LLC, Scottsdale, AZ (US)

(72) Inventors: Pavel Horsky, Brno (CZ); Jan Plojhar, Mokra Horakov (CZ); Martin Dusek, Dolni Redice (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 18/679,131

(22) Filed: May 30, 2024

(65) Prior Publication Data

US 2025/0220792 A1     Jul. 3, 2025

Related U.S. Application Data

(60) Provisional application No. 63/617,365, filed on Jan. 3, 2024.

(51) Int. Cl.
| | |
|---|---|
| *H05B 45/375* | (2020.01) |
| *H02M 1/00* | (2007.01) |
| *H02M 3/156* | (2006.01) |
| *H05B 45/325* | (2020.01) |

(52) U.S. Cl.
CPC ........ *H05B 45/375* (2020.01); *H02M 1/0009* (2021.05); *H02M 3/156* (2013.01); *H05B 45/325* (2020.01)

(58) Field of Classification Search
CPC .. H02M 3/156; H02M 1/0009; H05B 45/325; H05B 45/375
See application file for complete search history.

(56) References Cited

U.S. PATENT DOCUMENTS

| | | | |
|---|---|---|---|
| 9,887,614 B1 | 2/2018 | Horsky et al. | |
| 9,935,556 B1 * | 4/2018 | Rana | H02M 3/33507 |
| 10,028,343 B2 | 7/2018 | Eggermont | |

(Continued)

OTHER PUBLICATIONS

Liu et al., "A 26 W 97%-Efficiency Fast-Settling Dimmable LED Driver With Dual-nMOS-Sensing Based Glitch-Tolerant Synchronous Current Control for High-Brightness Solid-State Lighting Applications," IEEE Journal of Solid-State Circuits, 12015, 4 pages.

(Continued)

*Primary Examiner* — Patrick C Chen
(74) *Attorney, Agent, or Firm* — Brake Hughes Bellermann LLP

(57)          ABSTRACT

A converter circuit may require sensing an average current as feedback for regulating the average current supplied to a load. Sensing the average current may be inaccurate due to the non-ideal behavior of devices in the converter circuit. The disclosed circuits and methods help to improve the accuracy of the sensed average current by ignoring portions of a PWM cycle. Some of the ignored portions are based on a peak threshold for a rising current of a PWM cycle and a valley threshold for a falling current of a PWM cycle. The peak threshold and the valley threshold may be adjusted to control the average current and the switching frequency of the converter circuit.

20 Claims, 6 Drawing Sheets

(56) References Cited

U.S. PATENT DOCUMENTS

| | | | |
|---|---|---|---|
| 10,122,254 B2 | 11/2018 | Horsky et al. | |
| 10,122,255 B2 | 11/2018 | Horsky et al. | |
| 10,236,771 B1 | 3/2019 | Plojhar et al. | |
| 10,622,896 B1 * | 4/2020 | Eggermont | H05B 45/305 |
| 10,925,137 B2 | 2/2021 | Eggermont | |
| 11,522,450 B2 | 12/2022 | Horsky et al. | |
| 2014/0028205 A1 | 1/2014 | Lischka | |
| 2014/0070728 A1 | 3/2014 | Pflaum | |
| 2019/0379270 A1 | 12/2019 | Pullen et al. | |
| 2020/0313553 A1 * | 10/2020 | Horsky | H05B 45/375 |
| 2021/0160985 A1 * | 5/2021 | Eggermont | H02M 3/158 |

OTHER PUBLICATIONS

Capodivacca et al., "Integrated Buck LED Driver With Application Specific Digital Architecture," IEEE, 978-1-4799-0645-1/13, 2013, pp. 343-346.

Cheng et al., "A Wide-Input-Range Low-Profile Adaptive Delay Compensated Hysteretic LED Driver With Enhanced Current Accuracy," IEEE Journal of Solid-State Circuits, vol. 57, No. 8, Aug. 2022, pp. 2474-2485.

Qu et al., "A Low-EMI, High-Reliability PWM-Based Dual-Phase LED Driver for Automotive Lighting," IEEE Journal of Emerging and Selected Topics in Power Electronics, vol. 6, No. 3, Sep. 2018, pp. 1179-1189.

Lim et al., "A 200-V 98. 16%-Efficiency Buck LED Driver Using Integrated Current Control to Improve Current Accuracy for Large-Scale Single-String LED Backlighting Applications," IEEE Transactions on Power Electronics, vol. 31, No. 9, Sep. 2016, pp. 6416-6427.

Liu et al., "A Current-Accuracy-Enhanced Wide-Input-Range DC-DC LED Driver With Feedforward Synchronous Current Control," IEEE Transactions on Circuits and Systems-I: Regular Papers, vol. 65, No. 11, Nov. 2018, pp. 3996-4006.

Search Report for German Application No. 10 2024 124 515.8, dated Mar. 10, 2026, 10 pages (with full English translation).

* cited by examiner

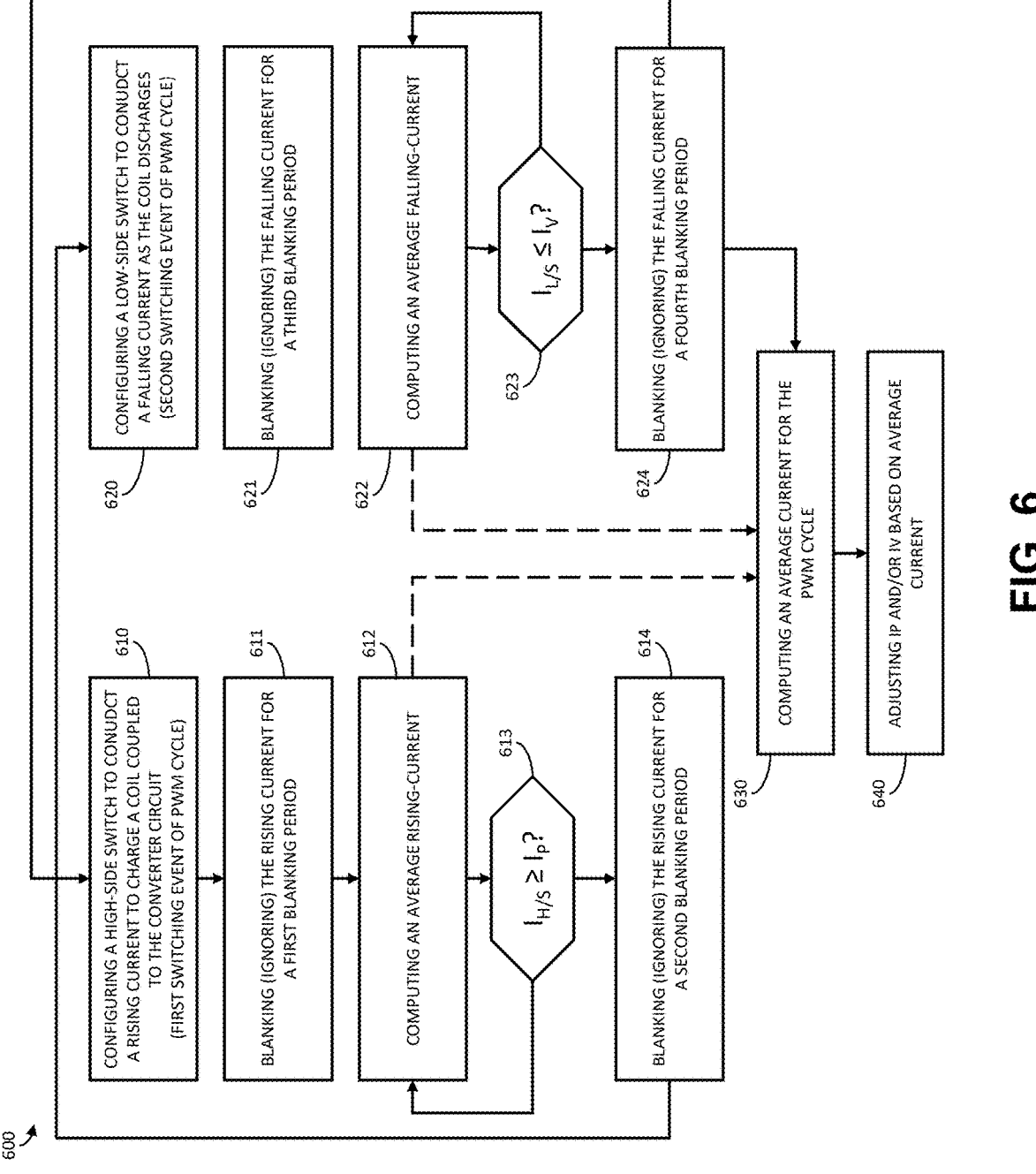

FIG. 6

CONFIGURING A HIGH-SIDE SWITCH TO CONUDCT A RISING CURRENT TO CHARGE A COIL COUPLED TO THE CONVERTER CIRCUIT (FIRST SWITCHING EVENT OF PWM CYCLE) — 610

BLANKING (IGNORING) THE RISING CURRENT FOR A FIRST BLANKING PERIOD — 611

COMPUTING AN AVERAGE RISING-CURRENT — 612

$I_{H/S} \geq I_P$? — 613

BLANKING (IGNORING) THE RISING CURRENT FOR A SECOND BLANKING PERIOD — 614

CONFIGURING A LOW-SIDE SWITCH TO CONUDCT A FALLING CURRENT AS THE COIL DISCHARGES (SECOND SWITCHING EVENT OF PWM CYCLE) — 620

BLANKING (IGNORING) THE FALLING CURRENT FOR A THIRD BLANKING PERIOD — 621

COMPUTING AN AVERAGE FALLING-CURRENT — 622

$I_{L/S} \leq I_V$? — 623

BLANKING (IGNORING) THE FALLING CURRENT FOR A FOURTH BLANKING PERIOD — 624

COMPUTING AN AVERAGE CURRENT FOR THE PWM CYCLE — 630

ADJUSTING IP AND/OR IV BASED ON AVERAGE CURRENT — 640

600

CONVERTER CIRCUIT AND CONTROL METHOD THEREOF

CROSS-REFERENCE TO RELATED APPLICATION

This application claims the benefit of U.S. Provisional Application No. 63/617,365, filed on Jan. 3, 2024, which is hereby incorporated by reference in its entirety.

FIELD OF THE DISCLOSURE

The present disclosure relates to a synchronous converter circuit and more specifically to a direct-current to direct-current (i.e., DC/DC) buck converter configured to output a regulated average current.

BACKGROUND

Some lighting applications may include a bank of light emitting diodes (LEDs) that can be selectively switched ON/OFF in real time according to sensed conditions. For example, LED lighting at the front of a vehicle may include LEDs that can be temporarily switched OFF to reduce the light intensity in the direction of an oncoming vehicle. A driver circuit for the LED lighting should be able to provide an average current that can remain approximately constant (e.g., within 5% of a target value) despite fluctuations in a voltage caused by the switching described above.

SUMMARY

A DC/DC buck converter circuit suitable for driving LED lighting is disclosed. The disclosed buck converter can control average current with high accuracy over a range of load conditions without the need for expensive current sensing at the output.

In some aspects, the techniques described herein relate to a converter circuit including: a high-side switch configured conduct a rising current to charge a coil when the high-side switch is configured in an ON condition; a high-side sensor coupled to the high-side switch configured to sense the rising current; and a high-side blanking circuit configured to block an averaging subcircuit from receiving the rising current for a first blanking period after the high-side switch is configured in the ON condition and for a second blanking period after the rising current reaches a peak threshold, the averaging subcircuit configured to output an average rising-current based on the rising current not blocked by the high-side blanking circuit.

In some aspects, the techniques described herein relate to a method for controlling a converter circuit, the method including: turning ON a high-side switch to conduct a rising current to charge a coil; sensing the rising current; blanking the rising current for a first blanking period after turning ON the high-side switch and for a second blanking period after the rising current reaches a peak threshold; computing an average rising-current based on the rising current between the first blanking period and the second blanking period; turning ON a low-side switch to conduct a falling current as the coil discharges; sensing the falling current; blanking the falling current for a third blanking period after turning ON the low-side switch and for a fourth blanking period after the falling current reaches a valley threshold; computing an average falling-current based on the falling current between the third blanking period and the fourth blanking period; computing an average current for a pulse width modulation (PWM) cycle based on the average rising-current and the average falling-current; and adjusting the peak threshold and the valley threshold based on the average current.

In some aspects, the techniques described herein relate to an LED driver including: a high-side switch configured conduct a rising current when the high-side switch is turned ON; a high-side sensor coupled to the high-side switch configured to sense the rising current; a low-side switch configured conduct a falling current when the low-side switch is turned ON; an averaging subcircuit configured to output an average current based on: the rising current between a first blanking period after the high-side switch is turned ON and a second blanking period after the rising current reaches a peak threshold; and the falling current between a third blanking period after the low-side switch is turned ON and a fourth blanking period after the falling current reaches a valley threshold; and a controller configured to control the peak threshold and the valley threshold based on the average current.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 6 illustrates a method for controlling a buck converter according to a possible implementation of the present disclosure.

The components in the drawings are not necessarily to scale relative to each other. Like reference numerals designate corresponding parts throughout the several views.

DETAILED DESCRIPTION

A DC/DC buck converter circuit (i.e., converter circuit) can be configured to regulate an average current output to a load by sensing the load current at the output. Sensing the load current at the output, however, may not be practical for at least a few reasons. One reason for this is that the output current may be in a high-power domain, which can require expensive and lossy sensing devices to accurately measure the output current. Accordingly, to reduce cost and complexity, a current (or currents) that represent the output current may be measured to calculate an estimate of the average output current. A technical problem with this approach is that the accuracy of the estimated average current may be affected by various factors. For example, transients resulting from switching can disrupt the currents used to estimate the average current. Blanking these transients can help but can cause errors in the estimate, especially as the duty cycle of the switching is changed. The present disclosure describes a buck converter including circuitry to reduce or eliminate these errors. The disclosed technique may have at least the technical effect of improving the accuracy of the estimate of the average current, which can improve the regulation provided by the device without significantly increasing its cost and complexity.

The converter circuit disclosed here can be used for applications requiring an average current that is regulated to a target value (i.e., regulated value) as a load changes. For example, a battery charger may utilize the converter circuit to provide an approximately constant current (e.g., <5% variation) for charging. Another example is a lighting system. The lighting system may utilize the converter circuit as an LED driver to provide an approximately constant current as the illumination is changed. In what follows, a converter circuit used as an LED driver for a lighting system will be discussed in detail. This implementation is not intended to be limiting as one having skill in the art will recognize that the disclosed techniques may be applied more generally.

Figure 1:
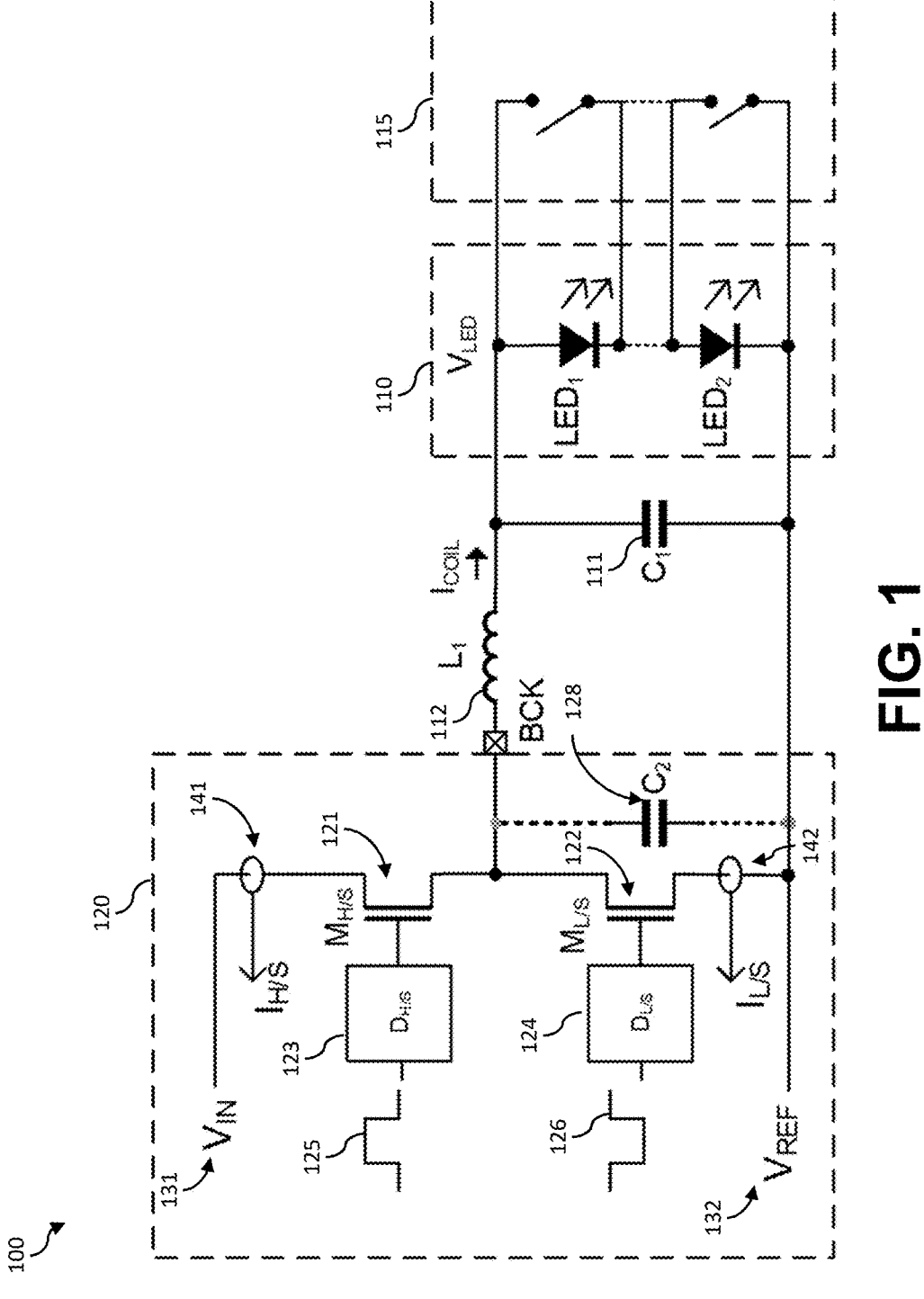
FIG. 1 illustrates a portion of a lighting system according to a possible implementation of the present disclosure.

FIG. 1 illustrates a portion of a lighting system according to a possible implementation of the present disclosure. The lighting system 100 includes a bank of light emitting diodes (i.e., LED bank 110). The LED bank 110 includes a plurality of LEDs coupled in series. The lighting system 100 may further include a switch bank 115. Each LED may have a bypass switch in the switch bank 115 coupled in parallel with the LED. When a bypass switch of the switch bank 115 is turned ON (i.e., closed) the corresponding LED may be shorted so that it does not emit light. As a result, the voltage ($V_{LED}$) of the LED bank 110 can change according to the state of the switches, which may change over time. In response to changes in the voltage, an LED driver 120 may change its operation to regulate a current ($I_{COIL}$) supplied to the LED bank 110.

The lighting system 100 optionally includes a capacitor 111 and coil 112 (i.e., inductor) that can maintain a fairly constant voltage/current at a load (e.g., LED bank 110) while the coil 112 is charged and discharged by a half-bridge switching circuit of a LED driver 120.

The half-bridge switching circuit of the LED driver 120 includes a high-side switch 121 and a low-side switch 122 that are coupled in series between an input voltage 131 (i.e., power supply, upper rail, etc.) and a reference voltage 132 (i.e., ground, lower rail, etc.). During operation the high-side switch 121 and the low-side switch 122 can be alternatively switched ON/OFF (i.e., conducting/blocking) by a pulse width modulated signal (i.e., PWM signal 125) and its complement 126. The PWM signal 125 and its complement 126 are input to a high-side driver 123 and a low-side driver 124, respectively. The drivers may be configured to convert low-power domain switching signals from a digital controller (e.g., PWM signals) to signals capable of switching high-power domain devices (e.g., high-side switch 121).

As shown in FIG. 1, the high-side switch 121 can be turned ON to conduct a high-side current ($I_{H/S}$) to the coil 112. The high-side current can be sensed (i.e., measured) by a high-side sensor 141. In this phase of a PWM cycle, the current conducted by the high-side switch 121 increases as the coil 112 is charged (by $V_{IN}$). After this phase of the PWM cycle, the low-side switch can be turned ON to conduct a low-side current ($I_{L/S}$) to the coil 112. The low-side current can be sensed (i.e., measured by a low-side sensor 142. In this phase of the PWM cycle, the current conducted by the low-side switch decreases as the coil is discharged. In other words, the coil current ($I_{COIL}$), which is approximately the load current in steady state, consists of the high-side current and the low-side current.

Figure 2:
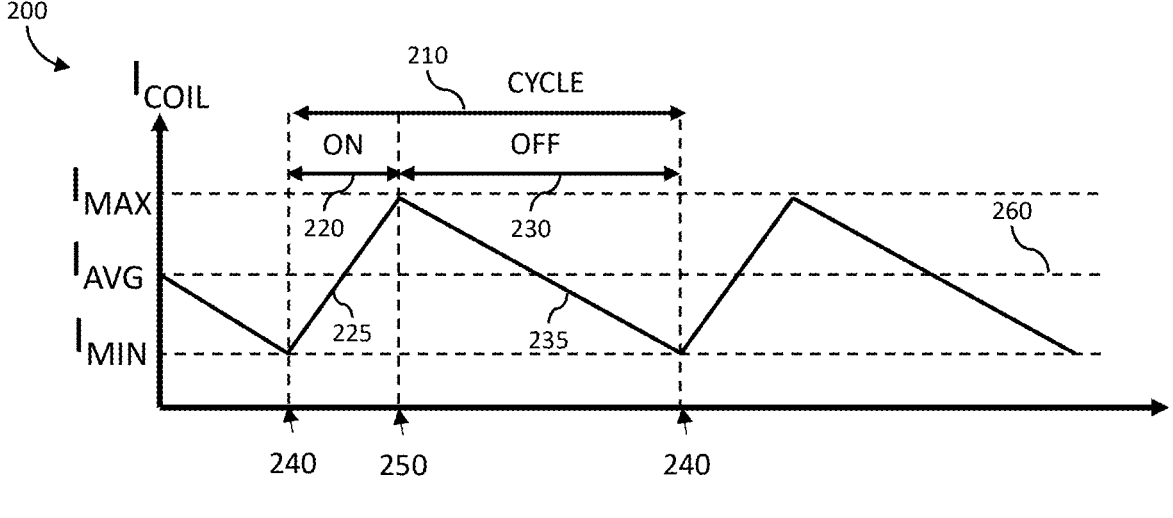
FIG. 2 illustrates a possible coil current of the lighting system shown in FIG. 1 according to a possible implementation of the present disclosure.

FIG. 2 illustrates a possible coil current ($I_{COIL}$) of the lighting system shown in FIG. 1 according to a possible implementation of the present disclosure. During a PWM cycle 210, the coil current 200 ($I_{COIL}$) supplied to the load (i.e., LED bank 110) increases and decreases to form a ripple waveform that varies between a maximum current ($I_{MAX}$) and a minimum current ($I_{MIN}$).

The PWM cycle 210 includes a first switching event 240, which starts the rising current 225 portion of the PWM cycle, during which the coil 112 is charged. The PWM cycle 210 further includes a second switching event 250, which starts a falling current 235 portion of the PWM cycle, during which the coil 112 is discharged.

The switching events can be triggered by current measurements. For example, after the first switching event 240, the second switching event 250 can be triggered when a rising current 225 reaches (e.g., is equal to) a peak threshold, which in this case is $I_{MAX}$. After the second switching event 250, the first switching event 240 can be triggered when a falling current 235 reaches (e.g., is equal to) a valley threshold, which in this case is $I_{MIN}$.

At the first switching event 240, the high-side switch 121 is turned ON (i.e., made conducting) and the low-side switch 122 is turned OFF (i.e., made non-conducting). This portion of the PWM cycle 210 may be referred to as the ON period 220 (i.e., charging period). At the second switching event 250 the low-side switch 122 is turned ON and the high-side switch 121 is turned OFF. This portion of the PWM cycle 210 may be referred to as the OFF period 230 (i.e., discharging period).

A period of the PWM cycle 210 may be the time between subsequent first switching events (or second switching events). A duty of a PWM cycle is related to the portion of the PWM cycle 210 spent in the ON period 220 (i.e., ON time). The duty cycle is the ratio of the ON time to the period of a PWM cycle 210. For example, when the ON time equals the OFF time, the duty cycle is 50%.

An average current 260 ($I_{AVG}$) can be computed for the PWM cycle 210 based on the functions of the rising current and falling current. When the currents are linear, as shown in FIG. 2, the average value can be given by the equation $I_{AVG}=(I_{MAX}-I_{MIN})/2$. In this case, the rising current average equals the falling current average. In general, the functions of the rising current and falling current can be non-linear and non-equal.

Controlling (i.e., regulating) the average current on a cycle-by-cycle basis may include measuring an average current for the PWM cycle 210, comparing the average current to a regulation value (i.e., target value), and adjusting the peak threshold and valley threshold (i.e., switching events) based on the comparison.

Controlling (i.e., regulating) the PWM frequency (i.e., cycle frequency) on a cycle-by-cycle basis may include measuring a period of a PWM cycle 210, comparing the period to a target value, and adjusting the peak threshold and valley threshold (i.e., switching events) based on the comparison.

Controlling the LED driver 120 to adjust its operation to output a target average current may require an accurate measurement of an average coil current for each PWM cycle. Measuring the coil current (i.e., load current) directly, however, may not be practical due to cost and complexity constraints. Additionally, measuring the coil current directly (e.g., with a resistance) can increase a power dissipated by the device and decrease its efficiency. Accordingly, the LED driver 120 may be configured to estimate (i.e., compute) the average current ($L_{AVG}$) based on measurements of the high-side current ($I_{H/S}$) and the low-side current ($I_{L/A}$), which as mentioned previously, can combine at the output (i.e., BCK pin) to form the coil current ($I_{COIL}$).

Figure 3:
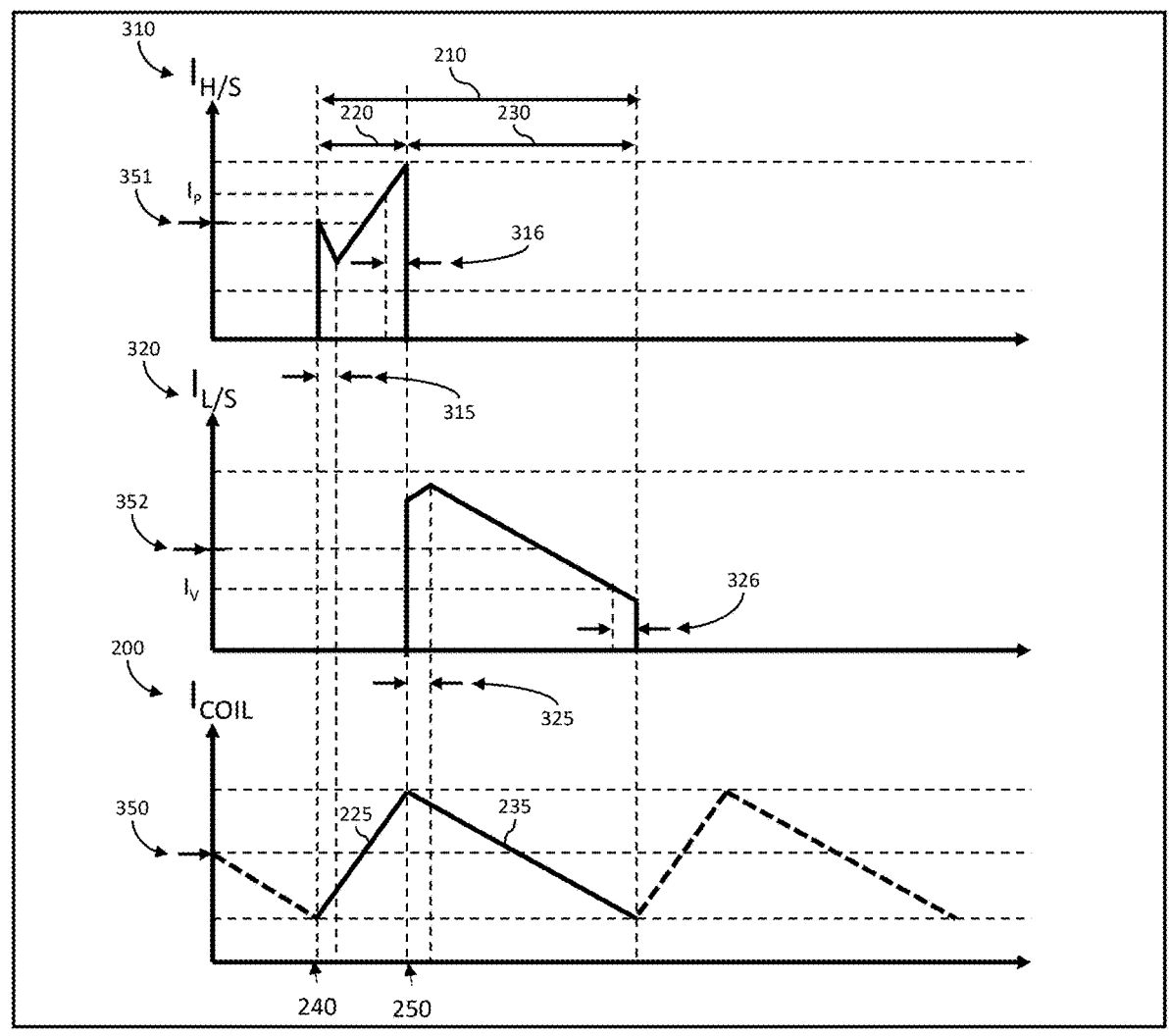
FIG. 3 are graphs illustrating currents in a converter circuit in relation to a coil current according to a possible implementation of the present disclosure.

FIG. 3 includes graphs illustrating currents in a converter circuit (e.g., LED driver 120) in relation to a coil current according to a possible implementation of the present disclosure. The graphs include a coil current 200 ($I_{COIL}$) flowing to the load. In a PWM cycle 210, the coil includes a rising current 225 during the ON period 220 and a falling current 235 during the OFF period 230.

The graphs of FIG. 3 further include a high-side current 310 ($I_{H/S}$), which can be a current sensed by a high-side sensor 141 at a terminal (e.g., drain terminal) of the high-side switch (e.g., NMOS transistor). As shown, the high-side current 310 ($I_{H/S}$) does not match the rising current 225 for a period at the beginning of the ON period 220.

The graphs of FIG. 3 further include a low-side current 320 ($I_{L/S}$), which can be a current sensed by a low-side sensor 142 at a terminal (e.g., source terminal) of the low-side switch (e.g., NMOS transistor). As shown, the low-side current 320 ($I_{L/S}$) does not match the falling current 235 for a period at the beginning of the OFF period 230.

The differences between the coil current 200, the high-side current 310, and low-side current 320 may result, at least in part, from non-ideal operating characteristics of the high-side switch 121 and the low-side switch 122, which can be represented as a parasitic capacitance 128 at the switching node (i.e., BCK pin) of the LED driver 120.

As shown in FIG. 3, at the first switching event 240, the high-side current 310 overshoots the rising current 225 at the beginning of the ON period 220 (i.e., for a first blanking period 315) as the parasitic capacitance 128 is charged. After the charging transient settles, the high-side current 310 increases (i.e., rises) according to the coil current 200 (e.g., matches the coil current).

As shown in FIG. 3, at the second switching event 250, the low-side current 320 remains lower than the falling current 235 at the beginning of the OFF period 230 (i.e., for a third blanking period 325) as the parasitic capacitance 128 is discharged. The low-side current and the discharging capacitor combine to form the coil current during the third blanking period 325. After the discharging transient settles (i.e., after the capacitor is discharge), the low-side current 320 decreases (i.e., falls) according to the coil current 200 (e.g., matches the coil current). The period of the charging transient (i.e., first blanking period 315) can equal the period of the discharging transient (i.e., third blanking period 325) because they are both based on the parasitic capacitance 128. In a possible implementation, however, the period of the charging transient (i.e., first blanking period 315) can be different from (e.g., shorter than) the period of the discharging transient (i.e., third blanking period 325) to account for other practical phenomenon in the converter circuit. Besides transients some errors in the sensing may occur after a switching event because it takes some time for the switches to turn fully ON.

When the duty cycle of the PWM cycle 210 is 50 percent, the rising and falling slopes are the same and the first blanking period 315 equals the third blanking period 325 and the percentage of the ON period 220 that the charging transient occupies is equal to the percentage of the OFF period 230 that the discharging transient occupies. In this case, the average current 350 may be computed from an average rising current determined by (i) an average rising-current 351 (i.e., average of $I_{H/S}$) neglecting the first blanking period 315 and (ii) an average falling-current 352 (e.g., average of $I_{I/S}$), neglecting the third blanking period 325.

Neglecting the first blanking period 315 can shift the average rising-current 351 higher than the average current 350. Neglecting the third blanking period 325 can shift the average falling-current 352 lower than the average current 350. When the duty cycle is 50 percent, these shifts are equal and opposite so that the average of the rising current (i.e., average rising-current 351) and the average of the falling current (i.e., average falling-current 352) can be combined (e.g., averaged) to obtain an average current 350 that is accurate.

The duty cycle (D) may be expressed as the ratio of the output voltage ($V_{OUT}$) to the input voltage ($V_{IN}$) (i.e., $D=V_{OUT}/V_{IN}$). As the duty cycle of the PWM signal is changed (e.g., to regulate a voltage at the load), this method becomes less accurate because the slopes (i.e., percentages) of the rising current 225 and the falling current 235 are not equal. The converter circuit of the present disclosure can improve the accuracy of the average current computation using an approach that is less sensitive to duty cycle than other approaches. In particular, additional blanking periods are added to the ends of the ON period 220 and the OFF period 230, respectively. For example, a second blanking period 316 may be added to the end of the ON period 220 and a fourth blanking period 326 can be added to the end of the OFF period 230. These added blanking periods can reduce or eliminate the shifts in the average caused by the transient blanking so that the average current 350 computed from the average rising-current 351 and the average falling-current 352 (neglecting the blanking periods) is more accurate (e.g., matches the average current 350).

Figure 4:
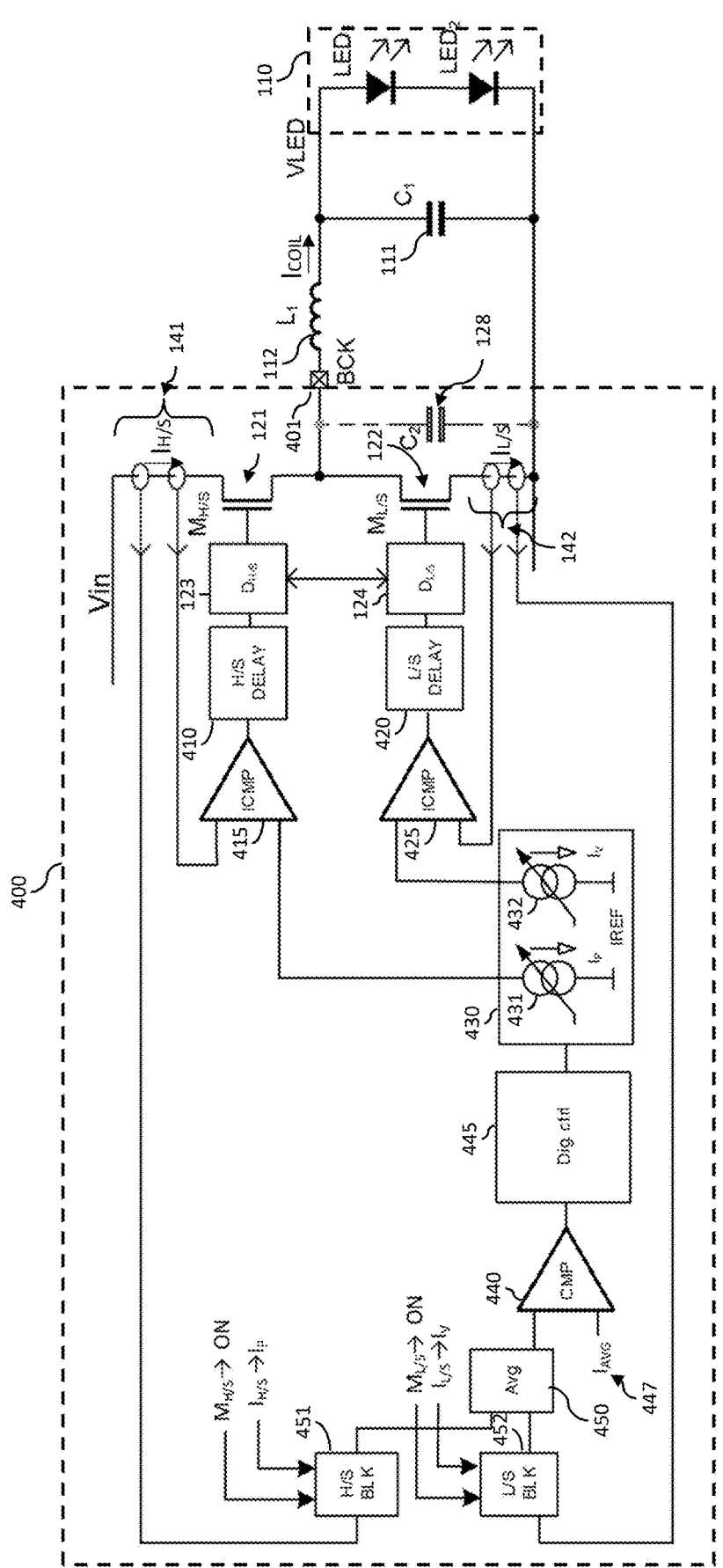
FIG. 4 illustrates a converter circuit according to a possible implementation of the present disclosure.

FIG. 4 illustrates a converter circuit according to a possible implementation of the present disclosure. An output 401 of the converter circuit 400 is coupled to a load (e.g., LED bank 110) via an inductor (i.e., coil 112) and a capacitor 111. The converter circuit 400 is configured to charge and discharge the coil 112 according to a pulse width modulation (PWM) signal so that the average current ($I_{COIL}$) supplied to the load can be maintained by the coil 112 (and capacitor 111).

The converter circuit 400 may be implemented as (i.e., integrated within) a semiconductor package (e.g., chip) that includes (i.e., contains) a high-side switch 121, low-side switch 122, sensing circuitry, logic circuitry and a controller 445 (e.g., digital controller) to charge and discharge the coil 112 to regulate an average current. The regulation can require feedback of an average current drawn by the load (e.g., average of the $I_{COIL}$). This feedback may be computed within the semiconductor package based on measurements of the high-side current ($I_{H/S}$) and the low side current ($I_{L/S}$). Accordingly, the converter circuit 400 includes a high-side sensor 141 configured to sense the high-side current and a low-side sensor 142 configured to sense the low-side current. As discussed, this approach may be more desirable than attempting to sense the coil current directly but can be negatively affected by non-ideal behavior of the circuit, including (but not limited to) transients caused by a parasitic capacitance 128.

In a possible implementation, the high-side sensor 141 includes a first high-side sensor configured to sense the high-side current for computing an average rising-current and a second high-side sensor configured to sense the high-side current for determining when to end a charging mode (i.e., $M_{H/S}$=ON, $M_{L/S}$=OFF) of the converter circuit 400. In a possible implementation, the low-side sensor 142 includes a first low-side sensor configured to sense the low-side current for computing an average falling-current and a second low-side sensor configured to sense the low-side current for determining when to end a discharging mode (i.e., $M_{H/S}$=OFF, $M_{L/S}$=ON) of the converter circuit 400.

The converter circuit 400 may further include an averaging subcircuit 450 configured to generate and/or compute an average current based on a current at its input. In a possible implementation, the averaging subcircuit 450 has a first input configured to receive a measurement of the rising current from the high-side sensor 141 and a second input configured to receive a measurement of the falling current from the low-side sensor 142.

The averaging subcircuit 450 may be implemented via analog electronics. For example, the averaging subcircuit 450 may be implemented as a low-pass filter including one or more inductors and capacitors. The low pass filter is configured to return a signal (e.g., voltage) having a level that corresponds to an average value of the sensed current. In another possible implementation the averaging subcircuit is a digital circuit, in which samples of the measured current are averaged over a sliding window of time (e.g., over each PWM cycle).

To improve the accuracy of the computed average at the output of the averaging subcircuit 450, the converter circuit 400 further includes a high-side blanking circuit 451 coupled between the high-side sensor 141 and the averaging subcircuit 450. When triggered, the high-side blanking circuit 451 is configured to block the high-side current ($I_{H/S}$) from being received at (i.e., considered by) the averaging subcircuit 450 for a blanking period. In a possible implementation, the high-side blanking circuit 451 may include a timer (e.g., counter) configured to decouple the high-side sensor 141 from the averaging subcircuit 450, or otherwise blank the measurements from, the high-side sensor 141, until the timer reaches a conclusion.

The high-side blanking circuit 451 may be triggered by a signal ($M_{H/S}$→ON) initiated by a first event corresponding to the rising current 225 of the ON period 220. The first event can be the high-side switch ($M_{H/S}$) transitioning to the ON condition (i.e., the first switching event 240). After being triggered by the first event, the high-side blanking circuit 451 may block (e.g., decouple, ground, etc.) the high-side current for the first blanking period 315. During the first blanking period 315, the averaging subcircuit 450 does not receive, or otherwise does not consider, the high-side current in an average rising-current computed by the averaging subcircuit 450. For example, the averaging is stopped (i.e., paused) during the first blanking period 315.

The high-side blanking circuit 451 may also be triggered by a signal ($I_{H/S}$→$I_P$) initiated by a second event corresponding to the rising current 225 of the ON period 220. The second event can be the high-side current reaching a peak threshold (e.g., $I_{H/S}$=$I_P$). After being triggered by the second event, the high-side blanking circuit 451 may block (e.g., decouple) the high-side current for the second blanking period 316. During the second blanking period 316, the averaging subcircuit 450 does not receive, or otherwise does not consider, the high-side current in the average rising-current computed by the averaging subcircuit 450. For example, the averaging is stopped (i.e., paused) during the second blanking period 316.

As a result of the high-side blanking circuit 451, the averaging subcircuit 450 computes the average rising-current for a PWM cycle based on the rising (high-side) current between the first blanking period 315 of the PWM cycle and the second blanking period 316 of the PWM cycle. Because the high-side blanking circuit 451 can function identically each time it is triggered, the first blanking period 315 can equal the second blanking period 316.

The converter circuit 400 further includes a low-side blanking circuit 452 coupled between the low-side sensor 142 and the averaging subcircuit 450. When triggered, the low-side blanking circuit 452 is configured to block (e.g., decouple, ground, etc.) the low-side current ($I_{L/S}$) from being received at (i.e., considered by) the averaging subcircuit 450 for a blanking period. In a possible implementation, the low-side blanking circuit 452 may include a timer (e.g., counter) configured to decouple the low-side sensor 142 from the averaging subcircuit 450, or otherwise blank the measurements from, the low-side sensor 142, until the timer reaches a conclusion.

The low-side blanking circuit 452 may be triggered by a signal ($M_{L/S}$→ON) initiated by a third event corresponding to the falling current 235 of the OFF period 230. The third event can be the low-side switch ($M_{L/S}$) transitioning to the ON condition (i.e., the second switching event 250). After being triggered by the third event, the low-side blanking circuit 452 may block (e.g., decouple) the low-side current for the third blanking period 325. During the third blanking period 325, the averaging subcircuit 450 does not receive, or otherwise does not consider, the low-side current in an average falling-current computed by the averaging subcircuit 450.

The low-side blanking circuit 452 may also be triggered by a signal ($I_{L/S}$→$I_V$) initiated by a fourth event corresponding to the falling current 235 of the OFF period 230. The fourth event can be the low-side current reaching a valley threshold (e.g., $I_{L/S}$=$I_V$). After being triggered by the fourth event, the low-side blanking circuit 452 may block (e.g., decouple, ground, etc.) the low-side current for the fourth blanking period 326. During the fourth blanking period 326, the averaging subcircuit 450 does not receive, or otherwise does not consider, the low-side current in the average falling-current computed by the averaging subcircuit 450.

As a result of the low-side blanking circuit 452, the averaging subcircuit 450 computes the average falling-current for a PWM cycle based on the falling (low-side) current between the third blanking period 325 of the PWM cycle and the fourth blanking period 326 of the PWM cycle. Because the low-side blanking circuit 452 can function identically each time it is triggered, the third blanking period 325 can equal the fourth blanking period 326. The third blanking period 325 and the fourth blanking period 326 may be unequal to the first blanking period 315 and the second blanking period 316. In other words, a timer (e.g., counter) of the high-side blanking circuit 451 may be configured for a different duration than a timer (e.g., counter) of the low-side blanking circuit 452.

The averaging subcircuit 450 may compute, or otherwise output, an average current that is based on (e.g., is the average of) the average rising-current and the average falling-current. One having skill in the art will recognize that the average current can be computed in a variety of different ways which could all be used in the present disclosure. Further, another statistical measurement (e.g., median) may be used in place of average (i.e., mean). Accordingly, the averaging subcircuit 450 may be configured differently without departing from the scope of the present disclosure.

In a possible implementation, the averaging subcircuit 450 may be configured to output a running average of the current it receives. In another possible implementation, the averaging subcircuit 450 may output an average current on a cycle-by-cycle basis of the PWM signal (i.e., for a window of time). In another possible implementation, if a peak threshold (or valley threshold) is reached during a blanking period, the ON phase (or OFF phase) may be ignored in the average current computation. In this scenario the OFF phase (or ON phase), which is not ignored, may be long enough to compute the average current. The averaging subcircuit 450 can support a continuous current mode (CCM) of the converter circuit 400 as well as a forced continuous current mode (FCCM) of the converter circuit. The averaging subcircuit 450 can also support a non-linear rising current and/or a non-linear falling current.

It should also be noted that while the high-side switch ($M_{H/S}$) is OFF, the high-side current ($I_{H/S}$) is approximately zero and so does not significantly contribute to the average computed by the averaging subcircuit 450. As a result, switching the inputs may not be required. In a possible implementation, however, the averaging subcircuit 450 may switch between the two inputs based on the state of the switches in the converter circuit 400.

The operation of the converter circuit 400 may be controlled by adjusting the peak threshold ($I_P$) used to trigger the second blanking period 316 and the valley threshold ($I_V$) used to trigger the fourth blanking period 326. The converter circuit 400 includes a reference circuit 430 that includes a first adjustable current source configured to generate the peak threshold 431 ($I_P$) and a second adjustable current source configured to generate the valley threshold 432 ($I_V$). A controller 445 (e.g., digital controller) of the converter circuit may be configured to adjust these thresholds to regulate the average current 350 and/or adjust a period (and frequency) of the PWM cycle 210. The current sources in the reference circuit 430 can be much smaller than the currents in the high-side switch 121 or the low-side switch 122. For example, these currents can be more than 1000 times smaller. The currents may be based on a current sensing ratio of the high-side sensor 141 and the low-side sensor 142. The high-side sensor 141 may have multiple current sensing ratios. For example, a first current sensing ratio for a current to the high-side comparator 415 and a second (e.g., different) current sensing ratio for a current to the high-side blanking circuit 451. Likewise, the low-side sensor 142 may have multiple current sensing ratios. For example, a first current sensing ratio for a current to low-side comparator 425 and a second (e.g., different) current sensing ratio for a current to the low-side blanking circuit 452.

The average current at the output of the averaging subcircuit 450 may be compared (e.g., using a comparator 440) to a regulation value 447 (i.e., target average current ($I_{AVG}$) or ratio thereof). This first comparison may be used by the controller 445 to control the operation (e.g., switching) of the converter circuit 400 to regulate the output of the converter circuit 400 (i.e., the average current).

Switching of the high-side switch 121 is controlled based on a comparison between a high-side current measurement from the high-side sensor 141 and a peak threshold 431 ($I_P$). For example, the converter circuit 400 may include a high-side comparator 415 coupled to the high-side sensor 141 and the peak threshold 431. The high-side comparator 415 can be configured to output a first trigger signal when the high-side current (i.e., rising current of the PWM cycle) equals (or exceeds) the peak threshold 431 (i.e., $I_{H/S} \geq I_P$). The first trigger signal activates a high-side delay circuit 410 coupled between the high-side comparator 415 and the high-side driver 123. The high-side delay circuit 410 is configured to output a high-side switching signal to turn OFF the high-side switch 121 (via the high-side driver 123) after a first delay (i.e., high-side delay). The first delay can be made equal to the second blanking period 316 so that the ON period 220 ends at the conclusion of the second blanking period 316. The second blanking period 316 can be equal to the first blanking period 315. In other words, a timer (e.g., counter) of the high-side delay circuit 410 may be configured for the same duration as a timer (e.g., counter) of the high-side blanking circuit 451 or they can share a timer. In a possible implementation, however, they can be set to different durations.

Switching of the low-side switch 122 is controlled based on a comparison between the measured low-side current from the low-side sensor 142 and the valley threshold 432 ($I_V$). For example, the converter circuit 400 may include a low-side comparator 425 coupled to the low-side sensor 142 and the valley threshold 432. The low-side comparator 425 can be configured to output a second trigger signal when the low-side current (i.e., falling current of the PWM cycle) equals (or is less than) the valley threshold 432 (i.e., $I_{L/S} \leq I_V$). The second trigger signal activates a low-side delay circuit 420 coupled between the high-side comparator 415 and the low-side driver 124. The low-side delay circuit 420 is configured to output a low-side switching signal to turn OFF the low-side switch 122 (via the low-side driver 124) after a second delay (i.e., low-side delay). The second delay can be made equal to the fourth blanking period 326 so that the OFF period 230 ends at the conclusion of the fourth blanking period 326, thereby making the fourth blanking period 326 equal to the third blanking period 325. In other words, a timer (e.g., counter) of the low-side delay circuit 420 may be configured for the same duration as a timer (e.g., counter) of the low-side blanking circuit 452. In a possible implementation, however, they can be set to different durations.

Communication between the high-side driver 123 and the low-side driver 124 may keep the high-side switch 121 and the low-side switch 122 in complementary ON/OFF conditions. For example, the high-side driver 123 transmitting an OFF signal to a controlling terminal (e.g., gate terminal) of the high-side switch 121 may trigger the low-side driver 124 to transmit an ON signal to a controlling terminal (e.g., gate terminal) of the low-side switch 122.

Figure 5A:
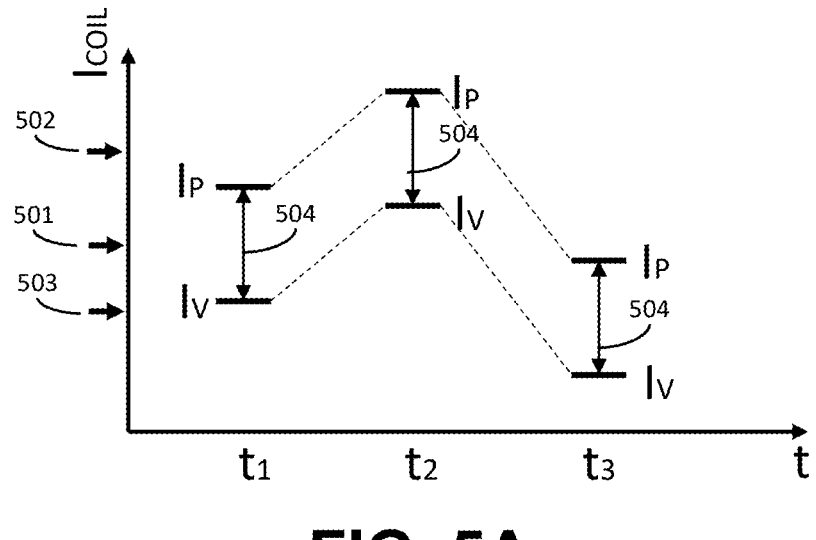
FIG. 5A illustrates threshold adjustment in a converter circuit to adjust an average current.

Adjustment of the thresholds ($I_P$, $I_V$) can be used to regulate the output average current and control the frequency of the PWM signal. FIG. 5A illustrates threshold adjustment in a converter circuit to adjust (i.e., control) an average current. As mentioned, the average current may be computed based on the average rising-current and the average falling-current of a PWM cycle, and the peak threshold 431 and the valley threshold 432 may be adjusted based on the average current. As shown in FIG. 5A, the peak threshold 431 and the valley threshold 432 may be separated by a range (i.e., fixed range) that can be shifted up or shifted down (i.e., increased or decreased) to adjust the average current, which is between (e.g., midway between) the peak threshold 431 ($I_P$) and the valley threshold 432 ($I_V$). The range 504 can represent the current ripple on the coil.

As shown in FIG. 5A, at a second time ($t_2$) after a first time ($t_1$), the peak threshold 431 ($I_P$) and the valley threshold 432 ($I_V$) may be increased by the same amount so that a range 504 remains the same but the average current moves from a first average current 501 (at $t_1$) to a (higher) second average current 502 (at $t_2$). At a third time ($t_3$), after the second time ($t_2$), the peak threshold 431 ($I_P$) and the valley threshold 432 ($I_V$) may be decreased by the same amount so that the range 504 remains the same but the average current moves from the second average current 502 (at $t_2$) to a (lower) third average current 503 (at $t_3$). In practice, the change of the average current may take a few PWM cycles to settle at its new value. Because the range 504 between the valley threshold 432 ($I_V$) and the peak threshold 431 ($I_P$) is the same at each time ($t_1$, $t_2$, $t_3$) the PWM frequency is not changed (i.e., fixed).

The period of the PWM cycle may be determined by the controller 445. For example, the controller 445 may be configured to monitor the high-side driver 123 and the low-side driver 124 to determine switching events. In a possible implementation, the controller may include a timer (e.g., counter) configured to measure the duration between switching events to determine ON period 220 and the OFF period 230 of each PWM cycle. The controller 445 may be further configured to combine (e.g., add) the ON period 220 and the OFF period 230 to compute the period of the PWM cycle 210. This computation may occur on a cycle-by-cycle basis.

The controller 445 may be further configured to compare the period of the PWM cycle to a target value. Based on the comparison, the controller 445 may be further configured to adjust the peak threshold 431 and the valley threshold 432 to control the period of the PWM cycle. Adjustments to the period (i.e., $T_{PWM}$) of the PWM cycle correspond to adjustments to the switching frequency (i.e., $F_{PWM}$) of the converter circuit 400 (i.e., $F_{PWM}=1/T_{PWM}$). In some implementations, it may be desirable to regulate a switching frequency at a fixed value to reduce/eliminate electromagnetic interference (i.e., EMI).

Figure 5B:
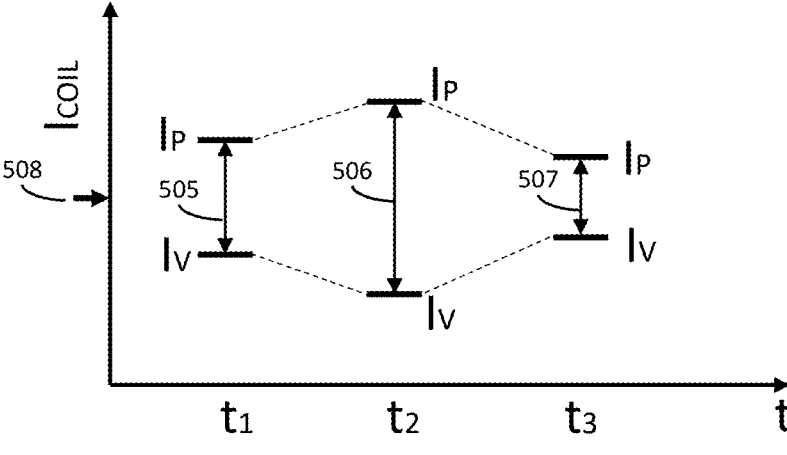
FIG. 5B illustrates threshold adjustment in a converter circuit to adjust a period of a pulse width modulation (PWM) cycle.

FIG. 5B illustrates threshold adjustment in a converter circuit to adjust a period of the PWM cycle. The controller may adjust a range between the peak threshold 431 and the valley threshold 432 to change the period of the PWM cycle.

As shown in FIG. 5B, at a second time ($t_2$) after a first time ($t_1$), the peak threshold 431 ($I_P$) is increased and the valley threshold 432 ($I_V$) is decreased to increase a first range 505 at the first time ($t_1$) to a second range 506 at the second time ($t_2$). The expanded (i.e., increased, enlarged) range corresponds to an increase of the PWM cycle after the adjustment. In other words, the PWM frequency at the second time ($t_2$) is less than the PWM frequency at the first time ($F_{PWM}(t_1)$>$F_{PWM}(t_2)$). At a third time ($t_3$) after the second time ($t_2$), the peak threshold 431 ($I_P$) is decreased and the valley threshold 432 ($I_V$) is increased to decrease the second range 506 at the second time ($t_2$) to a third range 507 at a third time ($t_3$). The range being contracted (i.e., decreased, reduced) reduces the period of the PWM cycle after the adjustment. In other words, the PWM frequency at the third time ($t_3$) is greater than the PWM frequency at the second time ($F_{PWM}(t_3)$>$F_{PWM}(t_2)$). Because the peak threshold 431 and valley threshold 432 are adjusted at each time ($t_1$, $t_2$, $t_3$) by equal and opposite amounts, the average current 508 at each time ($t_1$, $t_2$, $t_3$) is not changed (i.e., fixed).

FIG. 6 illustrates a method for controlling a converter circuit according to a possible implementation of the present disclosure. The method 600 includes configuring 610 a high-side switch (i.e., $M_{H/S}$) to conduct (ON) a rising current ($I_{H/S}$) to charge a coil, which is coupled to the converter circuit. Turning the high-side switch ON (and the low-side switch OFF) can be the first switching event of a PWM cycle. The method 600 further includes blanking 611 (ignoring, discarding, etc.) the rising current for a first blanking period after the first switching event. In other words, the first switching event may start the first blanking period. The method 600 further includes computing 612, or otherwise generating, an average of the rising current (i.e., average rising-current) after the first blanking period. The method 600 further includes comparing 613 the rising current ($I_{H/S}$) to a peak threshold ($I_P$) and blanking 614, or otherwise ignoring, the rising current for a second blanking period when the rising current is greater than or equal to the peak threshold. In other words, a second blanking period may start when the rising current equals the peak threshold. The portion of the PWM cycle from the first switching event to the end of the second blanking period is the ON period of the PWM cycle.

The method 600 further includes configuring 620 a low-side switch (i.e., $M_{L/S}$) to conduct (ON) a falling current ($I_{H/S}$) to discharge a coil, which is coupled to the converter circuit. Turning the low-side switch ON (and the high-side switch OFF) can be a second switching event of the PWM cycle. The method 600 further includes blanking 621 (ignoring, discarding, etc.) the falling current for a third blanking period after the second switching event. In other words, the second switching event may start the third blanking period. The method 600 further includes computing 622, or otherwise generating, an average of the falling current (i.e., average falling-current) after the third blanking period. The method 600 further includes comparing 623 the falling current ($I_{L/S}$) to a valley threshold ($I_V$) and blanking 624, or otherwise ignoring, the falling current for a fourth blanking period when the falling current is less than or equal to the valley threshold. In other words, a fourth blanking period may start when the falling current equals the valley threshold. The portion of the PWM cycle from the second switching event to the end of the fourth blanking period is the OFF period of the PWM cycle.

The method 600 further includes computing 630, or otherwise generating, an average current (e.g. for the PWM cycle) based on the average rising-current and the average falling-current. The method further includes adjusting 640 the peak threshold ($I_P$) and/or the valley threshold ($I_V$) based on the average current.

In the specification and/or figures, typical embodiments have been disclosed but variations may exist due to the imperfect operation of the devices. For example, the switch events may be delayed due to delays in the high-side switch 121 and the low-side switch 122 and their respective drivers. A switch delay ($SW_{delay}$) is a time which is needed for the drivers and switches to change state. For example (see FIG. 3), at the end of the ON period 220 there is a switch delay associated with turning the high-side switch 121 OFF and the low-side switch 122 ON. The switch delay can extend the second blanking period 316 because the coil current continues to increase during the switch delay. As a result, the switch delay can increase the second blanking period 316 and decrease the third blanking period 325. Imbalances due to switching delays, or other sources, at the peak current (i.e., second switching event 250) or at the valley current (i.e., (first switching event 240) can lead to errors in the average current calculation if not compensated for.

Returning to FIG. 4, compensation for the switch delay can include monitoring a voltage at the output 401 (i.e., BCK pin) and then adjusting the blanking periods based on the monitored voltage. In a possible implementation, the converter circuit 400 can include a monitoring circuit for measuring the voltage at the BCK pin. When BCK pin voltage is in the middle of the input voltage range (e.g., $V_{IN}$-0V) the switches can be assumed to have changed the state. The switch delay can be computed as the time period between a first time at which the switches are turned ON/OFF and a second time at which the output voltage is half the input voltage range (i.e., $V_{OUT}=\frac{1}{2} V_{IN}$). In a possible implementation, the converter circuit 400 may include a comparator and timer configured to measure the switch delay for a PWM cycle. For a subsequent PWM cycle, the time to change the state of the switch may be shortened by the switching delay so that the blanking period is not extended by the switching delay. In other words, the blanking periods may include compensation for switching delays and this compensation may occur on a PWM cycle-by-cycle basis.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A converter circuit comprising:
a high-side switch configured to conduct a rising current for an ON period to charge a coil when the high-side switch is configured in an ON condition;
a high-side sensor coupled to the high-side switch configured to sense the rising current; and
a high-side blanking circuit configured to block an averaging subcircuit from receiving the rising current for a first blanking period and a second blanking period during the ON period, the first blanking period starting after the high-side switch is configured in the ON condition and the second blanking period starting after the rising current reaches a peak threshold, the averaging subcircuit configured to output an average rising-current for the ON period based on the rising current between the first blanking period and the second blanking period, which is not blocked by the high-side blanking circuit.

2. The converter circuit according to claim 1, further comprising:
a low-side switch configured to conduct a falling current for an OFF period as the coil discharges when the low-side switch is configured in the ON condition;
a low-side sensor coupled to the low-side switch configured to sense the falling current; and
a low-side blanking circuit configured to block the averaging subcircuit from receiving the falling current for a third blanking period and a fourth blanking period during the OFF period, the third blanking period starting after the low-side switch is configured in the ON condition and the fourth blanking period starting after the falling current reaches a valley threshold, the averaging subcircuit configured to compute an average falling-current for the OFF period based on the falling current between the third blanking period and the fourth blanking period, which is not blocked by the low-side blanking circuit.

3. The converter circuit according to claim 2, further comprising a controller configured to:
compute an average current based on the average rising-current and the average falling-current; and
adjust the peak threshold and the valley threshold based on the average current.

4. The converter circuit according to claim 3, wherein the peak threshold and the valley threshold are separated by a range, the range shifted up or down based on the average current.

5. The converter circuit according to claim 2, further comprising a controller configured to:
compute a period based on a time corresponding to the rising current and the falling current; and
adjust the peak threshold and the valley threshold based on the period.

6. The converter circuit according to claim 5, wherein the peak threshold and the valley threshold are separated by a range, the range increased or decreased based on the period.

7. The converter circuit according to claim 2, further including:

a high-side comparator coupled to the high-side sensor and the peak threshold, the high-side comparator configured to output a first trigger signal when the rising current equals the peak threshold;

a high-side delay circuit coupled to the high-side comparator and activated by the first trigger signal to output a high-side switching signal after a first delay;

a high-side driver coupled between the high-side delay circuit and the high-side switch, the high-side driver configured to control the high-side switch in an OFF condition based on the high-side switching signal;

a low-side comparator coupled to the low-side sensor and the valley threshold, the low-side comparator configured to output a second trigger signal when the falling current equals the valley threshold;

a low-side delay circuit coupled to the low-side comparator and activated by the second trigger signal to output a low-side switching signal after a second delay; and a low-side driver coupled between the low-side delay circuit and the low-side switch, the low-side driver configured to control the low-side switch in the OFF condition based on the low-side switching signal.

8. The converter circuit according to claim 7, wherein:

the first delay equals the first blanking period; and the second delay equals the third blanking period.

9. The converter circuit according to claim 2, wherein:

the first blanking period and the second blanking period are equal; and the third blanking period and the fourth blanking period are equal.

10. The converter circuit according to claim 2, wherein the high-side sensor and the low-side sensor are integrated within a semiconductor package containing the high-side switch and the low-side switch.

11. The converter circuit according to claim 1, wherein the averaging subcircuit is a low-pass filter.

12. A method for controlling a converter circuit, the method comprising:

turning ON a high-side switch for an ON period to conduct a rising current to charge a coil;

sensing the rising current;

blanking the rising current for a first blanking period and a second blanking period during the ON period, the first blanking period starting after turning ON the high-side switch and the second blanking period starting after the rising current reaches a peak threshold;

computing an average rising-current for the ON period based on the rising current between the first blanking period and the second blanking period;

turning ON a low-side switch for an OFF period to conduct a falling current as the coil discharges;

sensing the falling current;

blanking the falling current for a third blanking period and a fourth blanking period during the OFF period, the third blanking period starting after turning ON the low-side switch and the fourth blanking period starting after the falling current reaches a valley threshold;

computing an average falling-current for the OFF period based on the falling current between the third blanking period and the fourth blanking period;

computing an average current for a pulse width modulation (PWM) cycle based on the average rising-current and the average falling-current; and adjusting the peak threshold and the valley threshold based on the average current.

13. The method according to claim 12, wherein:

the first blanking period equals the second blanking period; and the third blanking period equals the fourth blanking period.

14. The method according to claim 12, wherein adjusting the peak threshold and the valley threshold based on the average current includes:

increasing the peak threshold and the valley threshold when the average current for the PWM cycle is below a regulation value; and decreasing the peak threshold and the valley threshold when the average current for the PWM cycle is above the regulation value.

15. The method according to claim 14, wherein:

the peak threshold and the valley threshold are increased or decreased equally to maintain a range of currents defined as a difference between the peak threshold and the valley threshold.

16. The method according to claim 12, further comprising:

computing a period of the PWM cycle based on the ON period and the OFF period; and adjusting the peak threshold and the valley threshold based on the period of the PWM cycle.

17. The method according to claim 16, wherein adjusting the peak threshold and the valley threshold based on the period of the PWM cycle includes:

increasing the peak threshold and decreasing the valley threshold when the period of the PWM cycle is below a target value; and decreasing the peak threshold and increasing the valley threshold when the period of the PWM cycle is above the target value.

18. The method according to claim 12, further comprising:

computing the average current for the PWM cycle based on only the average falling-current when the rising current reaches the peak threshold before an end of the first blanking period.

19. An LED driver comprising:

a high-side switch configured to conduct a rising current when the high-side switch is turned ON for an ON period of a pulse width modulation (PWM) cycle;

a high-side sensor coupled to the high-side switch configured to sense the rising current;

a low-side switch configured to conduct a falling current when the low-side switch is turned ON for an OFF period of the PWM cycle;

an averaging subcircuit configured to output an average current based on:

an average rising-current for the ON period based on the rising current between a first blanking period and a second blanking period of the ON period, the first blanking period starting after the high-side switch is turned ON and the second blanking period starting after the rising current reaches a peak threshold; and an average falling-current for the OFF period based on the falling current between a third blanking period and a fourth blanking period of the OFF period, the third blanking period starting after the low-side switch is turned ON and the fourth blanking period starting after the falling current reaches a valley threshold; and a controller configured to control the peak threshold and the valley threshold based on the average current.

20. The LED driver according to claim 19, further comprising:

a high-side delay configured to delay turning the high-side switch OFF for the second blanking period after the rising current reaches the peak threshold; and a low-side delay configured to delay turning the low-side switch OFF for the fourth blanking period after the falling current reaches the valley threshold.

\* \* \* \* \*